United States Patent
Jeon et al.

(10) Patent No.: US 12,531,104 B2
(45) Date of Patent: Jan. 20, 2026

(54) REFERENCE VOLTAGE CALIBRATION METHOD THAT ENABLES STABLE AND CONTINUOUS DATA TRANSMISSION REGARDLESS OF OPERATING CONDITIONS

(71) Applicant: ELECTRONICS AND TELECOMMUNICATIONS RESEARCH INSTITUTE, Daejeon (KR)

(72) Inventors: Young-Deuk Jeon, Sejong-si (KR); Young-Su Kwon, Daejeon (KR); Yi-Gyeong Kim, Daejeon (KR); Su-Jin Park, Daejeon (KR); Min-Hyung Cho, Daejeon (KR); Jae-Woong Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 174 days.

(21) Appl. No.: 18/223,097

(22) Filed: Jul. 18, 2023

(65) Prior Publication Data
US 2024/0194241 A1 Jun. 13, 2024

(30) Foreign Application Priority Data

Dec. 8, 2022 (KR) .................. 10-2022-0170868
Jan. 31, 2023 (KR) .................. 10-2023-0012338

(51) Int. Cl.
G11C 16/10 (2006.01)
G11C 11/4074 (2006.01)
G11C 11/4076 (2006.01)

(52) U.S. Cl.
CPC ...... *G11C 11/4074* (2013.01); *G11C 11/4076* (2013.01)

(58) Field of Classification Search
CPC .................. G11C 11/4074; G11C 11/4076
See application file for complete search history.

(56) References Cited

U.S. PATENT DOCUMENTS

| 5,881,109 A | 3/1999 | Kim et al. |
| 7,429,913 B2 | 9/2008 | Kim et al. |
| (Continued) | | |

FOREIGN PATENT DOCUMENTS

| KR | 10-2021-0059598 A | 5/2021 |
| KR | 10-2021-0078572 A | 6/2021 |

OTHER PUBLICATIONS

Junyoung Song et al., "A 1-V 10-GB/s/pin Single-Ended Transceiver With Controllable Active-Inductor-Based Driver and Adaptively Calibrated Cascaded-Equalizer for Post-LPDDR4 Interfaces", IEEE Transactions on Circuits and Systems-I: Regular Papers, vol. 65, No. 1, Jan. 2018.

*Primary Examiner* — Mushfique Siddique
(74) *Attorney, Agent, or Firm* — LRK PATENT LAW FIRM

(57) ABSTRACT

Disclosed herein is an apparatus for adjusting a reference voltage. The apparatus may include a gate signal generation unit for generating an RDQS gate signal, a reference voltage generation unit for setting a reference voltage based on the RDQS gate signal, and a reset counter for holding a voltage at the time at which the RDQS gate signal becomes low when the RDQS gate signal is not applied to the reference voltage generation unit for a specific time period.

18 Claims, 4 Drawing Sheets

(56) References Cited

U.S. PATENT DOCUMENTS

| | | | |
|---|---|---|---|
| 9,401,721 B1* | 7/2016 | Barakat | H04L 7/033 |
| 11,217,299 B2 | 1/2022 | Jeon et al. | |
| 2008/0052553 A1* | 2/2008 | Rudrud | H03K 5/135 |
| | | | 713/401 |
| 2008/0291757 A1* | 11/2008 | Mizutani | G11C 7/1066 |
| | | | 365/193 |
| 2013/0290766 A1* | 10/2013 | Nguyen | G06F 1/12 |
| | | | 713/400 |
| 2018/0090190 A1* | 3/2018 | Hong | G11C 5/147 |
| 2021/0151091 A1* | 5/2021 | Jeon | G11C 11/4093 |
| 2022/0149828 A1 | 5/2022 | Gans | |
| 2024/0046976 A1* | 2/2024 | Pilolli | G11C 16/10 |

* cited by examiner

REFERENCE VOLTAGE CALIBRATION METHOD THAT ENABLES STABLE AND CONTINUOUS DATA TRANSMISSION REGARDLESS OF OPERATING CONDITIONS

CROSS REFERENCE TO RELATED APPLICATIONS

This application claims the benefit of Korean Patent Applications No. 10-2022-0170868, filed Dec. 8, 2022, and No. 10-2023-0012338, filed Jan. 31, 2023, which are hereby incorporated by reference in their entireties into this application.

BACKGROUND OF THE INVENTION

1. Technical Field

The present disclosure relates to a background-based reference voltage (VREF) calibration method that enables stable and continuous data transmission regardless of operating conditions.

2. Description of Related Art

Various types of memory, such as Double-Data Rate (DDR) memory, Graphics DDR (GDDR) memory, Low-Power DDR (LPDDR) memory, High-bandwidth Memory (HBM), and the like, are used in many electronic devices, including smartphones, desktops, laptops, servers, etc., according to the purpose of use and characteristics thereof. Memory is one of storage devices developed to store data and read data when needed, and generally has one data line per pin in order to store a large amount of data. In the case of GDDR memory, the memory bandwidth thereof has recently reached up to 16 Gbps/pin, and the transfer rate is more and more increasing.

However, when memory operates at high speeds, it is necessary to distinguish between 1 and 0 within a very short time period when data is transmitted. Therefore, it is required to minimize signal noise and quickly calibrate a reference voltage for distinguishing between 1 and 0 in response to external factors, such as temperature that can change the characteristics of the memory. Most memory controllers are designed to calibrate the reference voltage when a chip is operated first and to calibrate the reference voltage at predefined regular intervals or calibrate the same when it is determined through an embedded temperature sensor that the temperature of a memory chip has a certain range of variation. When the reference voltage is calibrated in a periodic or aperiodic manner, as described above, it causes a blackout period in which data transmission is impossible during the calibration time and decreases the overall data transfer rate. Also, an existing background calibration method for overcoming this limitation has the disadvantage of low availability, because it can be performed only under specific conditions.

The reference voltage is ideal when it has a value of ½ of the maximum and minimum voltage values of a data signal, that is, a median value. However, in practice, data having a value of 1 or 0 is randomly transmitted, and considering the channel loss equal to or greater than 15 dB, it is nearly impossible to find the maximum and minimum voltage values of a data signal due to signal distortion. Also, a method of calibrating a reference voltage (VREF) using a read data strobe (RDQS) signal has been proposed. However, this method is applicable only in a burst mode in which an RDQS clock is continuously applied, and has reduced accuracy as the interval during which no RDQS is applied increases.

SUMMARY OF THE INVENTION

An object of the present disclosure is to provide a background-based reference voltage adjustment apparatus and method that are capable of adjusting a reference voltage for distinguishing between 1 and 0 of a data signal regardless of operating conditions.

In order to accomplish the above object, an apparatus for adjusting a reference voltage according to an embodiment may include a gate signal generation unit for generating an RDQS gate signal, a reference voltage generation unit for setting a reference voltage based on the RDQS gate signal, and a reset counter for holding a voltage at the time at which the RDQS gate signal becomes low when no RDQS gate signal is applied to the reference voltage generation unit for a specific time period.

The reference voltage generation unit may further include a low-pass filter (LPF) that allows only a signal having a frequency component lower than a preset cutoff frequency to pass through.

The reference voltage generation unit may turn on or off the low-pass filter based on the RDQS gate signal.

The apparatus may further include an input switch controlled by the RDQS gate signal at the front stage of the low-pass filter.

The input switch may be turned on when the RDQS gate signal is high.

The input switch may be turned off when the RDQS gate signal is low.

When the input switch is turned off, the low-pass filter may maintain a previous capacitor value.

The apparatus may further include an amplifier controlled by the RDQS gate signal at the front stage of the low-pass filter.

When the RDQS gate signal is applied after the specific time period, the reset counter may control an output voltage to be updated after a setting time of the low-pass filter.

The apparatus may further include a data signal communication unit for transmitting and receiving a data signal and a data strobe signal reception unit for receiving a data strobe signal.

Also, in order to accomplish the above object, a method for adjusting a reference voltage according to an embodiment may include generating an RDQS gate signal, setting a reference voltage based on the RDQS gate signal, and holding a voltage at the time at which the RDQS gate signal becomes low when no RDQS gate signal is applied for a specific time period.

The method may further include allowing only a signal having a frequency component lower than a preset cutoff frequency to pass through a low-pass filter.

The low-pass filter (LPF) may be turned on or off based on the RDQS gate signal.

An input switch controlled by the RDQS gate signal may be further included at the front stage of the low-pass filter.

The input switch may be turned on when the RDQS gate signal is high.

The input switch may be turned off when the RDQS gate signal is low.

When the input switch is turned off, the low-pass filter may maintain a previous capacitor value.

An amplifier controlled by the RDQS gate signal may be further included at the front stage of the low-pass filter.

When the RDQS gate signal is applied after the specific time period, an output voltage may be controlled to be updated after a setting time of the low-pass filter.

The method may further include transmitting and receiving a data signal and receiving a data strobe signal.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
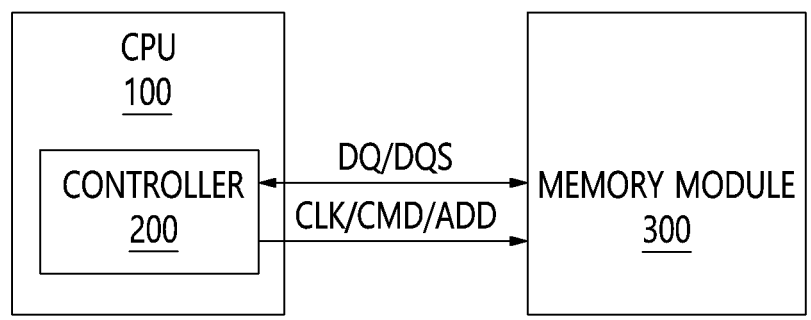
FIG. 1 is a block diagram illustrating a memory device according to an embodiment.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

In the present specification, each of expressions such as "A or B", "at least one of A and B", "at least one of A or B", "at least one of A, B, and C", and "at least one of A, B, or C" may include any one of the items listed in the expression or all possible combinations thereof.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

FIG. 1 is a block diagram illustrating a memory device according to an embodiment.

Referring to FIG. 1, a memory device may include a Central Processing Unit (referred to as a 'CPU' hereinbelow) 100 and a memory module 300.

The CPU 100 may include a reference voltage adjustment apparatus (controller) 200. The memory device 10 may be any of various Dynamic Random Access Memory (DRAM) devices, such as Double Data Rate Synchronous Dynamic Random Access Memory (DDR SDRAM), DDR2 SDRAM, DDR3 SDRAM, DDR4 SDRAM, DDR5 SDRM, Low Power Double Data Rate (LPDDR) SDRAM, LPDDR2 SDRAM, LPDDR3 SDRM, LPDDR4 SDRAM, LPDDR4X SDRAM, LPDDR5 SDRAM, Graphics Double Data Rate Synchronous Graphics Random Access Memory (GDDR SGRAM), GDDR2 SGRAM, GDDR3 SGRAM, GDDR4 SGRAM, GDDR5 SGRAM, GDDR6 SGRAM, and the like.

Alternatively, the memory device 10 may be a memory device in which DRAM dies are stacked, such as High Bandwidth Memory (HBM), HBM2, HBM3, and the like. Alternatively, the memory device 10 may be a Phase-change RAM (PRAM) device, a Static RAM (SRAM) device, a Resistive RAM (RRAM) device, a Ferroelectric RAM (FRAM) device, a Magneto-resistive RAM (MRAM) device, or the like.

The CPU 100 may interpret commands executed in the memory device and execute the commands. Also, the CPU 100 may perform operation on data stored in the memory module 300 or data read from the memory module 300.

The reference voltage adjustment apparatus 200 included in the CPU 100 may control the memory module 300. The reference voltage adjustment apparatus 200 may deliver a clock signal CLK, a command signal CMD, and an address signal ADD to the memory module 300. The command signal CMD may include a read command for requesting an operation of reading data from the memory module 300 and a write command for requesting an operation of writing data to the memory module 300.

The memory module 300 may include multiple memory chips. The memory module 300 may be implemented based on a Dual Inline Memory Module (DIMM) standard. For example, the memory module 300 may be implemented based on the standards of a Registered DIMM (RDIMM), a Load Reduced DIMM (LRDIMM), an Unbuffered DIMM (UDIMM), a Fully Buffered DIMM (FB-DIMM), or a Small Outline DIMM (SO-DIMM) (e.g., Single Inline Memory Module (SIMM)). The memory module 300 may send and receive a data signal DQ and a data strobe signal DQS to and from the reference voltage adjustment apparatus 200.

The reference voltage adjustment apparatus 200 according to an embodiment may adjust a reference voltage using an RDQS gate signal. The reference voltage adjustment apparatus 200 may perform a background calibration method that operates regardless of memory operation conditions by storing previous information in a section in which no RDQS clock is applied.

Unlike a data signal, an RDQS clock signal has a fixed period and duty cycle, and a driving circuit and transmission line that are almost the same as those used for a data signal are used for the RDQS clock signal. Therefore, a reference voltage for identifying a data signal may be simply acquired by detecting maximum and minimum voltages of the clock and using a low-pass filter. Also, a section in which no RDQS clock is applied is detected, and the previous output value of the low-pass filter is stored, whereby the present disclosure is applicable not only in a mode in which an RDQS is continuously applied but also in a mode in which an RDQS is discontinuously applied.

Figure 2:
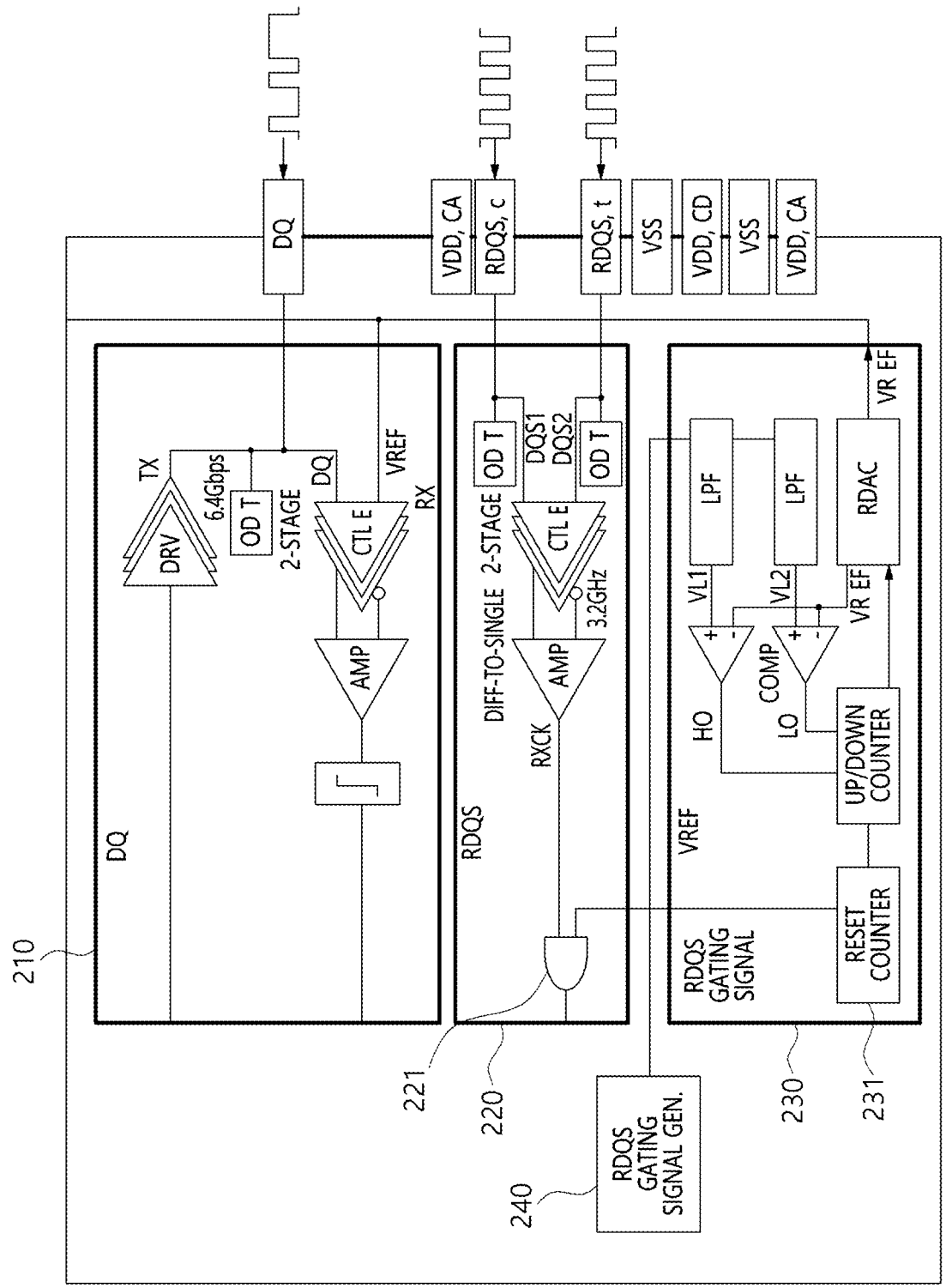
FIG. 2 is a circuit diagram illustrating an apparatus for adjusting a reference voltage according to an embodiment.

FIG. 2 is a circuit diagram illustrating an apparatus for adjusting a reference voltage according to an embodiment.

Referring to FIG. 2, the apparatus for adjusting a reference voltage according to an embodiment may include a data signal communication unit 210, a data strobe signal reception unit 220, a reference voltage generation unit 230, and an RDQS gate signal generation unit.

The data signal communication unit 210 may send and receive a data signal DQ to and from the memory module 300 through a data signal pin Pin_DQ. More specifically, the data signal communication unit 210 may receive a data signal DQ from the memory module 300 when a memory device performs a read operation, and may transfer a data signal DQ, including data information intended to be stored in the memory module 300, to the memory module 300 when the memory device performs a write operation.

The data signal communication unit 210 may include a data signal reception unit RX and a data signal transmission unit TX. More specifically, the data signal reception unit RX may include an On Die Termination (ODT) circuit ODT, a Continuous Time Linear Equalization (CTLE) circuit CTLE, an amplifier AMP, and a comparator COM. The data signal transmission unit TX may include a driver circuit DRV.

The data strobe signal reception unit 220 may send and receive a data strobe signal DQS to and from the memory module 300 through a first data strobe signal pin and a second data strobe signal pin. More specifically, the data strobe signal reception unit 220 may receive a data strobe signal DQS from the memory module 300 when the memory device 10 performs a read operation. In an embodiment of the present disclosure, a data signal DQ may be synchronized with the data strobe signal DQS.

The data strobe signal reception unit 220 may receive a data strobe signal DQS from the memory module 300, and may reconstruct a data strobe signal DQS. In order to minimize noise, the data strobe signal DQS1 received through the first data strobe signal pin and the data strobe signal DQS2 received through the second data strobe signal pin may be signals of complementary levels (or signals having a phase difference of 180 degrees). That is, the data strobe signal DQS1 applied through the first data strobe signal pin and the data strobe signal DQS2 applied through the second data strobe signal pin may be signals forming a differential signal.

The data strobe signal reception unit 220 may include a first ODT circuit ODT, a second ODT circuit ODT, a CTLE circuit CTLE, an amplifier AMP, and an AND gate 221.

The reference voltage generation unit 230 may adjust a reference voltage using an RDQS gate signal.

The reference voltage generation unit 230 may include a first Low-Pass Filter LPF, a second low-pass filter LPF, a first comparator C, a second comparator C, an up/down counter UDC, a Resistive Digital-to-Analog Converter (RDAC) circuit RDAC, and a reset counter 231.

The gate signal generation unit 240 may generate an RDQS gate signal. The RDQS gate signal generated by the gate signal generation unit 240 is an enable signal that is generated inside an SoC after the SoC transfers a read command to the memory, and is a signal for extracting as many received RDQS clocks, including a preamble and a post-amble, as the number of pieces of received data. Because the RDQS clock is applied only when the SoC gives a read command to the memory, the SoC is able to expect the length of the RDQS and the time at which of the RDQS is to be applied. Accordingly, the RDQS gate signal can be generated, and the low-pass filter of the reference voltage (VREF) calibration circuit based on the RDQS may be selectively enabled using this signal.

The reset counter 231 is a device for controlling the up/down counter. When no RDQS clock is applied for a long time, the value stored in the low-pass filter LPF may be discharged or the accuracy thereof may be reduced due to leakage current. Therefore, when no RDQS is applied for a specific time period, the RDAC output voltage is fixed through the reset counter 231, and the reset counter 231 performs a function to control the RDAC output voltage to be updated after the setting time of the low-pass filter even though an RDQS clock is applied after the specific time period.

Figure 3:
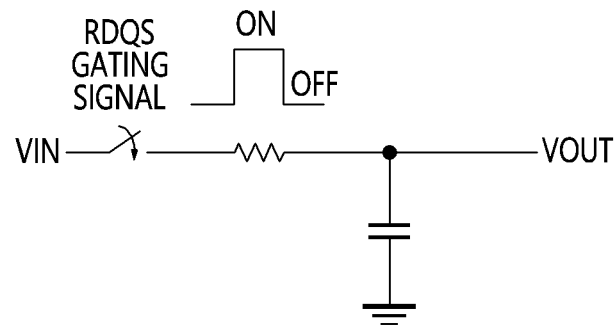
FIG. 3 is a circuit diagram illustrating an example of a low-pass filter according to an embodiment.

FIG. 3 is a circuit diagram illustrating an example of a low-pass filter according to an embodiment.

As illustrated in FIG. 3, an input switch may be added at the front stage of a passive low-pass filter according to an embodiment. The input switch may be controlled by an RDQS gate signal. When the RDQS signal is high, the input switch is turned on, whereby the low-pass filter may operate.

Conversely, when the RDQS signal is low, the input switch is turned off, and the low-pass filter maintains a previous value in the capacitor thereof.

Figure 4:
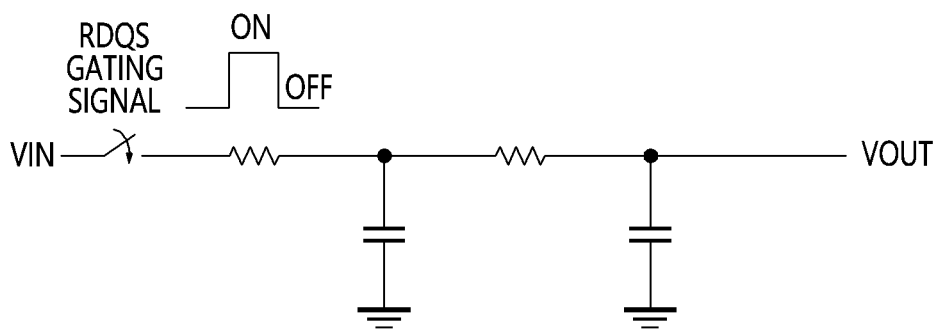
FIG. 4 is a circuit diagram illustrating another example of a low-pass filter according to an embodiment.

FIG. 4 is a circuit diagram illustrating another example of a low-pass filter according to an embodiment.

As illustrated in FIG. 4, an amplifier may be added at the front stage of a passive low-pass filter according to an embodiment. The amplifier may operate the low-pass filter using an RDQS gate signal.

Figure 5:
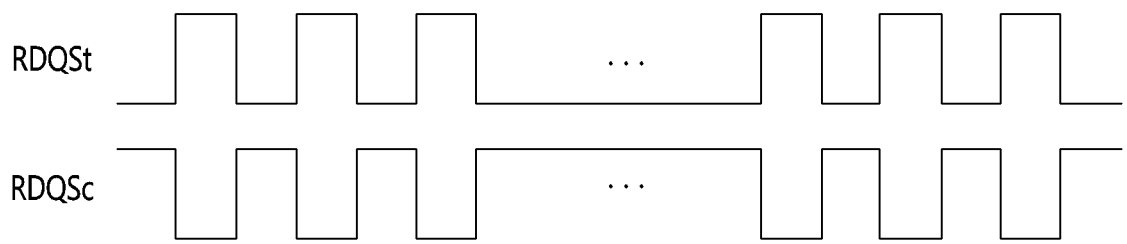
FIGS. 5 to 7 are views illustrating the output of a low-pass filter depending on an input RDQS clock according to an embodiment.
Figure 6:
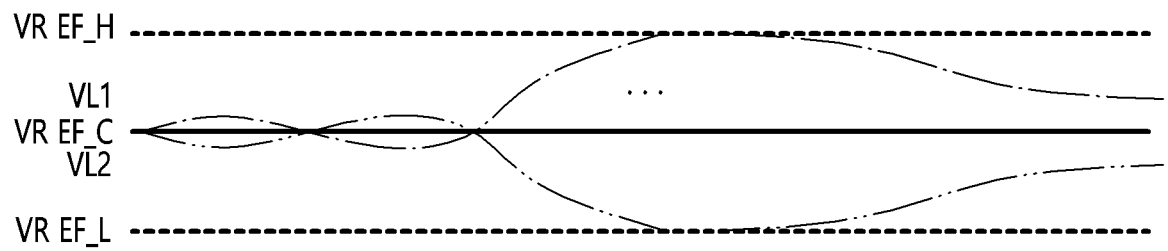
Figure 7:
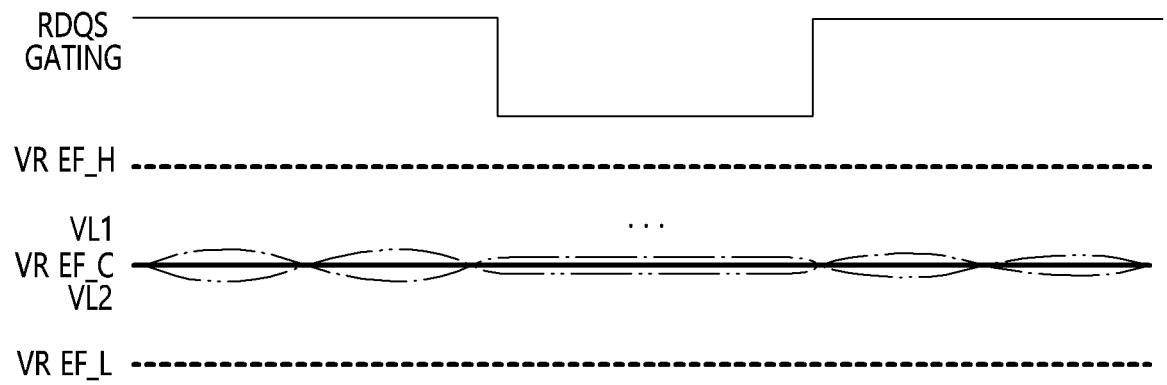

FIGS. 5 to 7 are views illustrating the output of a low-pass filter depending on an input RDQS clock according to an embodiment.

As illustrated in FIG. 5, an RDQS clock of VDD or GND may be applied for a specific time period.

In this case, because the voltage of the low-pass filter changes to an input voltage level, as illustrated in FIG. 6, a background calibration method may not be immediately applied to the RDQS clock that is applied after the setting time.

However, when the voltage at the time at which an RDQS gate signal becomes low is held and when an RDQS clock is applied after that, as illustrated in FIG. 7, continuous background reference voltage calibration is possible because it may operate from the previous voltage.

Figure 8:
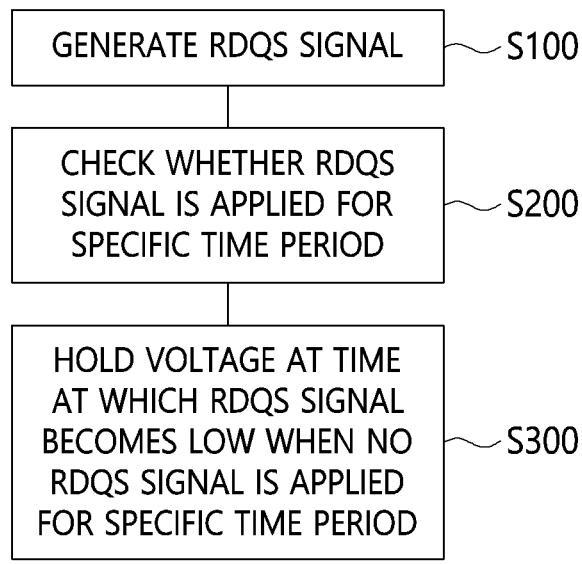
FIG. 8 is a flowchart illustrating a method for adjusting a reference voltage according to an embodiment.

FIG. 8 is a flowchart illustrating a method for adjusting a reference voltage according to an embodiment.

The method for adjusting a reference voltage according to an embodiment may be performed by a reference voltage adjustment apparatus according to an embodiment.

Referring to FIG. 8, the reference voltage adjustment apparatus according to an embodiment may generate an RDQS signal at step S100.

The reference voltage adjustment apparatus according to an embodiment may check whether the RDQS signal is applied for a specific time period at step S200.

The reference voltage adjustment apparatus according to an embodiment may hold a voltage at the time at which the RDQS signal becomes low at step S300 when no RDQS signal is applied for the specific time period.

An embodiment provides a reference voltage adjustment apparatus configured to convert a DQS signal having the same electrical characteristics as a DQ signal into a DC voltage via a low-pass filter and to find a reference voltage similar to the DC voltage.

This reference voltage adjustment apparatus may reduce a blackout period and improve data transmission efficiency because calibration of a reference voltage (VREF) is possible even in a data transmission period in which DQ and DQS signals are received.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. An apparatus for adjusting a reference voltage, comprising:
   a gate signal generation unit for generating an RDQS gate signal;
   a reference voltage generation unit for setting a reference voltage based on the RDQS gate signal, wherein the reference voltage generation unit comprises a low-pass filter (LPF) and a reset counter; and
   an input switch controlled by the RDQS gate signal at a front stage of the low-pass filter,
   wherein the reset counter maintains an output voltage of the low-pass filter at a time at which the RDQS gate signal becomes low when the RDQS gate signal is not applied to the reference voltage generation unit for a predetermined period of time.

2. The apparatus of claim 1, wherein the low-pass filter (LPF) allows only a signal having a frequency component lower than a preset cutoff frequency to pass through.

3. The apparatus of claim 2, wherein the reference voltage generation unit turns on or off the low-pass filter (LPF) based on the RDQS gate signal.

4. The apparatus of claim 3, further comprising:
   an amplifier controlled by the RDQS gate signal at a front stage of the low-pass filter.

5. The apparatus of claim 2, wherein, when the RDQS gate signal is applied after the predetermined period of time, the reset counter controls the output voltage to be updated after a setting time of the low-pass filter.

6. The apparatus of claim 1, wherein the input switch is turned on when the RDQS gate signal is high.

7. The apparatus of claim 1, wherein the input switch is turned off when the RDQS gate signal is low.

8. The apparatus of claim 7, wherein, when the input switch is turned off, the low-pass filter maintains a previous capacitor value.

9. The apparatus of claim 1, further comprising:
   a data signal communication unit for transmitting and receiving a data signal; and
   a data strobe signal reception unit for receiving a data strobe signal.

10. A method for adjusting a reference voltage, comprising:
    generating an RDQS gate signal;
    setting a reference voltage based on the RDQS gate signal; and
    maintaining an output voltage of a low-pass filter (LPF) at a time at which the RDQS gate signal becomes low when the RDQS gate signal is not applied for a predetermined period of time,
    wherein an input switch controlled by the RDQS gate signal is further included at a front stage of the low-pass filter.

11. The method of claim 10, further comprising:
    allowing only a signal having a frequency component lower than a preset cutoff frequency to pass through the low-pass filter.

12. The method of claim 11, wherein the low-pass filter (LPF) is turned on or off based on the RDQS gate signal.

13. The method of claim 12, wherein an amplifier controlled by the RDQS gate signal is further included at a front stage of the low-pass filter.

14. The method of claim 11, wherein, when the RDQS gate signal is applied after the predetermined period of time, the output voltage is controlled to be updated after a setting time of the low-pass filter.

15. The method of claim 10, wherein the input switch is turned on when the RDQS gate signal is high.

16. The method of claim 10, wherein the input switch is turned off when the RDQS gate signal is low.

17. The method of claim 16, wherein, when the input switch is turned off, the low-pass filter maintains a previous capacitor value.

18. The method of claim 10, further comprising:
    transmitting and receiving a data signal; and
    receiving a data strobe signal.

* * * * *